United States Patent Office 3,364,222
Patented Jan. 16, 1968

3,364,222
PROCESS FOR PREPARING LOWER ALKYL-2-ETHYLISONICOTINIC ACID ESTERS WHICH ARE USED AS INTERMEDIATES IN THE PREPARATION OF 2-ETHYLISONICOTINIC ACID THIAMIDE
Hans-Dieter Eilhauer, Leipzig, and Gerhard Reckling, Spergau, Germany, assignors to VEB Leuna-Werke "Walter Ulbricht," Leuna, Germany
No Drawing. Filed May 13, 1966, Ser. No. 549,785
3 Claims. (Cl. 260—294.8)

The present invention relates to a novel process for preparing 2-ethylisonicotinic acid thiamide, which is a drug used as tuberculostatic.

It is known to make 2-ethylisonicotinic acid thiamide by first reacting methyl-ethyl ketone with oxalic acid diethylester, whereby propionyl pyroracemic acid ethyl ester is produced which is then condensed with cyanoacetamide to 3-cyano-4-carbethoxy-6-ethylpyridone (2). This compound is converted by several operations, namely boiling with hydrochloric acid, treatment with phosphorus pentachloride, and reduction with hydrogen into 2-ethylisonicotinic acid ester, from which the 2-ethylisonicotinic acid thiamide is obtained by reaction with ammonia, splitting off of water, and addition of hydrogen sulfide. The above mentioned process thus consists of many stages of reactions.

There are more advantageous methods, which start from the pre-formed pyridine structure of the ethyl pyridine. In these known processes the 2-ethylpyridine is converted into its N-oxide, and the latter worked up to the 2-ethylisonicotinic acid thiamide.

Thus it is known to nitrate the N-oxide to 2-ethyl-4-nitropyridine-N-oxide and to reduce the latter subsequently to the 2-ethyl-aminopyridine. By diazotation, the latter is converted by way of the diazo compound into 2-ethyl-bromopyridine, which, heated with coppercyanide, gives 2-ethyl-4-cyanopyridine. In that process, the use of coppercyanide is particularly disadvantageous, since it has to be prepared in a separate process.

The disadvantage of the last mentioned process can be avoided when 2-ethyl-4-nitropyridine-N-oxide is converted into 2-ethyl-4-chloropyridine by means of phosphorus pentachloride. The chloropyridine so obtained is then reacted with alkalimetal bisulfite which yields 2-ethyl-4-pyridine sulfonic acid which, reacted with alkalimetal cyanide, will result in 2-ethyl-4-cyanopyridine.

According to another known process, 2-ethyl-4-chloropyridine is obtained by reaction of 2-ethylpyridine-N-oxide with sulfuryl chloride thus avoiding the preparation of 2-ethyl-4-nitropyridine-N-oxide as an intermediate. It is also known to replace in this reaction sulfurylchloride by a gaseous mixture of chlorine and sulfur dioxide. This ensures greater safety in this particular operation when carried out on a technical scale.

The last mentioned methods have the common factor of using 2-ethylpyridine as starting material. However, only small amounts of 2-ethylpyridine occur when pyridine bases are distilled and it is necessary to make it synthetically by several operations in an additional plant.

It is the object of the present invention to provide a method for preparing 2-ethylisonicotinic acid thiamide which is free of the above described shortcomings of the known methods.

It is a further object to provide a method for making 2-ethylisonicotinic acid thiamide which is simple and inexpensive, safe in its operation, uses a few operational stages, and starts from easily available material.

Other objects and advantages will become apparent from the following detailed description.

The above mentioned objects can be realized by using as starting material esters of isonicotinic acid, and comprises the steps of radically ethylating said esters by adding thereto dipropionyl peroxide, converting the mixture of 2-ethylisonicotinic acid ester and 3-ethylisonicotinic acid ester by treatment with ammonia and agents splitting off water into a mixture of 2-ethyl-4-cyanopyridine and 3-ethyl-4-cyanopyridine, and obtaining from the mixture pure 2-ethylisonicotinic acid thiamide by selective precipitation with $H_2S$.

In order to limit side reactions at the ester group, it is advantageous to use as starting material isonicotinic methyl ester.

The dipropionylperoxide is preferably used in a solution of propionic acid.

The mixture obtained upon radical ethylation containing about equal amounts of 2-ethyl- and 3-ethylisonicotinic esters is distilled to remove unreacted isonicotinic ester, then saponified with aqueous ammonia and the syrupy residue remaining upon concentration by evaporation, is dehydrated by agents splitting off water to a mixture of 2-ethyl-4-cyanopyridine and 3-ethyl-4-cyanopyridine. By treatment with $H_2S$ the two products can be separated, because due to the higher solubility of 3-ethylisonicotinic acid thiamide only 2-ethylisonicotinic acid thiamide will be recovered as pure product ready to be used for pharmaceutical purposes.

The invention will now be more fully explained by an example, but it should be understood that this is given by way of illustration and not of limitation. Many changes in the details can be made without departing from the spirit of the invention.

Example

In a glass vessel of 20 liters capacity, 12 kg. propionic anhydride are mixed with 0.2% by weight of conc. sulfuric acid. To this, 1.64 kg. of a 60% aqueous hydrogen peroxide solution are added drop by drop in the course of two hours while stirring. The temperature of the reaction mixture was maintained at 30–40° C. by cooling. After addition of the hydrogen peroxide, stirring was continued for one more hour at 20° C. The thus obtained dipropionyl peroxide solution was used for the radical alkylation.

2.8 kg. isonicotinic acid methyl ester was heated in a 20 liter vessel to 80–90° C. while stirring, the above dipropionyl peroxide solution was added at a rate of 1 kg. per hour. During the operation, a vigorous gas evolution was observed. After the addition was completed, the reaction was allowed to proceed for another hour at 100° C., until peroxide could no longer be detected in the reaction mixture.

The residue remaining after 8 kg. of propionic acid had distilled off, was neutralized with aqueous soda solution and extracted twice with 5 liters tricholoroethylene. The extract was dried with sodium sulfate and distilled under reduced pressure. 1.6 kg. isonicotinic acid methyl ester were recovered at a temperature of 82–86° C. and a pressure of 4 mm. Hg; furthermore, at 86–96° C. and the same pressure, 1 kg. of a mixture containing about equal parts of 2-ethyl- and 3-ethylisonicotinic ethyl ester was obtained. In addition, 0.425 kg. fractions having a higher boiling point were also obtained.

1.0 kg. of the fraction which distilled between 86 and 96° C. at 4 mm. Hg, was stirred at 20° C. with 1.4 kg. of a 30% aqueous ammonia solution for 20 hours. Subsequently, the solution was evaporated at reduced pressure to 1.0 kg. of a syrupy residue. This syrup was added drop by drop to granulated $\gamma$-alumina in an ammonia current of 100 liter $NH_3$ per hour at 360° C. The dehydration catalyst was in a vertical, electrically heated iron tube 100 cm. long and 5 cm. in diameter. The resulting reaction product was condensed by proper cooling. The aqueous phase of the reaction product was separated and extracted with 1 liter of ether. The ether residue was dried and combined with the organic phase. The product thus obtained was fractionated at normal pressure. At 216–220° C. a fraction amounting to 0.260 kg. distilled over, which consisted of 4% cyanopyridine, 58% 2-ethyl-4-cyanopyridine, 34% 3-ethyl-4-cyanopyridine and 4% impurities. The fraction distilling at 216–220° C. was dissolved with addition of 10 ml. triethylamine in 750 ml. methanol. Through the solution $H_2S$ was passed at 0° C. for 4 hours. Thereafter the 2-ethylisonicotinic acid thioamide had precipitated from the solution and was sucked off and rinsed with methanol.

Obtained were 0.145 kg. 2-ethylisonicotinic acid thioamide of a M.P. 161° C. corresponding to 10% of the theory calculated on isonicotinic methyl ester.

What is claimed is:

1. A process for preparing lower alkyl-2-ethylisonicotinic acid esters which comprises, radically ethylating said esters by adding thereto dipropionyl peroxide, separating the thus obtained mixture of lower alkyl-2-ethylisonicotinic acid ester and lower alkyl-2-ethylisonicotinic acid ester by known methods.

2. The process according to claim 1 wherein the starting material is isonicotinic acid methyl ester.

3. The process according to claim 1, wherein the dipropionyl peroxide is added in form of a solution in propionic acid.

References Cited

UNITED STATES PATENTS

| 2,653,942 | 9/1953 | Lee | 260—294.8 |
| 3,045,024 | 7/1962 | Cislak | 260—294.8 |

OTHER REFERENCES

Burger: Medicinal Chemistry, Interscience, 2nd ed., 1960, pp. 29 and 982. New Drugs, 1965 edition, evaluated by the A.M.A. Council on Drugs, Am. Med. Assn., Chicago.

JOHN D. RANDOLPH, *Primary Examiner.*

A. L. ROTMAN, *Assistant Examiner.*